(12) United States Patent
Xu et al.

(10) Patent No.: US 12,123,790 B2
(45) Date of Patent: Oct. 22, 2024

(54) PRESSURE DETECTION MODULE AND ELECTRONIC DEVICE

(71) Applicant: SHENZHEN GOODIX TECHNOLOGY CO., LTD., Shenzhen (CN)

(72) Inventors: Xinglang Xu, Shenzhen (CN); Ruilang Huang, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 242 days.

(21) Appl. No.: 17/887,746

(22) Filed: Aug. 15, 2022

(65) Prior Publication Data

US 2022/0390296 A1 Dec. 8, 2022

Related U.S. Application Data

(63) Continuation of application No. PCT/CN2020/109778, filed on Aug. 18, 2020.

(51) Int. Cl.
    G01L 1/14 (2006.01)
(52) U.S. Cl.
    CPC .................... G01L 1/142 (2013.01)
(58) Field of Classification Search
    CPC ........................................ G01L 1/142
    USPC ..................................... 73/862.626
    See application file for complete search history.

(56) References Cited

U.S. PATENT DOCUMENTS

| 2003/0047435 A1 | 3/2003 | Lee et al. |
| 2016/0033342 A1 | 2/2016 | Lyon et al. |
| 2018/0081480 A1* | 3/2018 | Ran ........................ G06F 3/0426 |
| 2019/0033143 A1 | 1/2019 | Teil |
| 2020/0037077 A1 | 1/2020 | Peterson et al. |

(Continued)

FOREIGN PATENT DOCUMENTS

| CN | 106201083 A | 12/2016 |
| CN | 205827354 U | 12/2016 |

(Continued)

OTHER PUBLICATIONS

Shenzhen Goodix Tech Co Ltd, International search report of PCT Patent Application No. PCT/CN2020/109778 issued on May 8, 2021.

*Primary Examiner* — Walter L Lindsay, Jr.
*Assistant Examiner* — Philip T Fadul
(74) *Attorney, Agent, or Firm* — Emerson, Thomson & Bennett, LLC; Roger D. Emerson; Matt J. Wilson

(57) ABSTRACT

A pressure detection module and an electronic device are provided. The pressure detection module is disposed between a support and an inner surface of a housing of the electronic device. The pressure detection module includes a first electrode, a second electrode, and a controller. The first electrode is fixed to an inner surface of a force input region of the housing, the second electrode is fixed to the support, and the second electrode is disposed opposite to the first electrode. The force input region of the housing is configured to drive the first electrode to move towards the second electrode based on a received external pressure. The controller is configured to determine a pressure detection result of the external pressure based on a capacitance change between the first electrode and the second electrode. The pressure detection module occupies small space in the electronic device, and is easy to mount.

15 Claims, 7 Drawing Sheets

(56) References Cited

U.S. PATENT DOCUMENTS

2020/0073504 A1   3/2020   Deng et al.
2020/0089400 A1*  3/2020   Zarraga ............... G06F 3/04144

FOREIGN PATENT DOCUMENTS

CN   106569628 A   4/2017
CN   108762587 A   11/2018

* cited by examiner

PRESSURE DETECTION MODULE AND ELECTRONIC DEVICE

CROSS-REFERENCE TO RELATED APPLICATION

This disclosure is a continuation of International Application No. PCT/CN2020/109778, filed on Aug. 18, 2020, the application of which is hereby incorporated by reference in its entirety.

TECHNICAL FIELD

This application relates to the field of electronic element technologies, in particular, to a pressure detection module and an electronic device.

BACKGROUND

An electronic device can control an operation corresponding to pressing by detecting, through a pressure detection module mounted inside the electronic device, whether the electronic device is pressed. For example, playback of music in an earphone is controlled by determining, through a pressure detection module mounted inside the earphone, whether the earphone is pressed. A pressure detection module is usually disposed in a narrow space of an electronic device, and how to reduce an internal space of the electronic device occupied by the pressure detection module becomes a technical problem to be resolved urgently.

SUMMARY

In view of the above, one of technical problems to be resolved by embodiments of this application is to provide a pressure detection module and an electronic device, to resolve some or all technical problems in the conventional technology.

According to a first aspect, an embodiment of this application provides a pressure detection module. The pressure detection module is disposed between a support and an inner surface of a housing of an electronic device. The pressure detection module includes a first electrode, a second electrode, and a controller. The first electrode is fixed to an inner surface of a force input region of the housing, the second electrode is fixed to the support, and the second electrode is disposed opposite to the first electrode. The force input region of the housing is configured to drive the first electrode to move towards the second electrode based on a received external pressure. The controller is configured to determine a pressure detection result of the external pressure based on a capacitance change between the first electrode and the second electrode.

According to a second aspect, an embodiment of this application provides an electronic device. At least one pressure detection module mentioned above is disposed inside a housing of the electronic device.

In the pressure detection module and the electronic device provided in the embodiments of this application, since the pressure detection module is disposed between an inner surface of the housing of the electronic device and a support, a first electrode included in the pressure detection module is fixed to an inner surface of a force input region of the housing, and a second electrode disposed opposite to the first electrode is fixed to the support. When the force input region of the housing receives an external pressure, the first electrode is driven to move towards the second electrode, so that a controller determines a pressure detection result of the external pressure based on a capacitance change between the first electrode and the second electrode. Therefore, the first electrode and the second electrode in the embodiments of this application only need to be respectively mounted on the inner surface of the force input region of the casing and the support, to implement pressure detection, space occupied in the electronic device is small, and the mounting is simple.

BRIEF DESCRIPTION OF THE DRAWINGS

Some specific embodiments of this application will be described in detail in the following in an exemplary but not limiting manner with reference to the drawings. Same reference numerals in the drawings indicate same or similar components or parts. Those skilled in the art should understand that these drawings are not necessarily drawn at ratios. In the drawings.

DETAILED DESCRIPTION

To resolve the above problems, the embodiments of this application provide a pressure detection module and an electronic device. The following further describes specific implementations of the embodiments of this application with reference to the drawings of the embodiments of this application.

Figure 1:
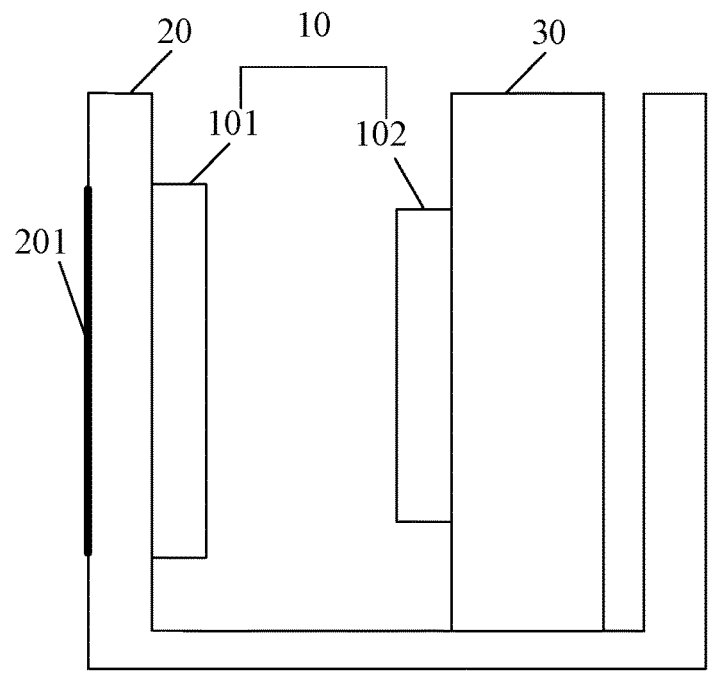
FIG. 1 is a structural diagram of a pressure detection module according to an embodiment of this application.

An embodiment of this application provides a pressure detection module, as shown in FIG. 1. FIG. 1 is a structural diagram of a pressure detection module according to Embodiment 1 of this application. The pressure detection module 10 is disposed between an inner surface of a housing 20 of an electronic device and a support 30. The pressure detection module 10 includes a first electrode 101, a second electrode 102, and a controller (not shown in the figure).

The first electrode 101 is fixed to an inner surface of a force input region 201 of the housing 20, the second electrode 102 is fixed to the support 30, and the second electrode 102 is disposed opposite to the first electrode 101.

The force input region 201 of the housing 20 is configured to drive the first electrode 101 to the second electrode 102 based on a received external pressure.

The controller is configured to determine a pressure detection result of the external pressure based on a capacitance change between the first electrode 101 and the second electrode 102.

Specifically, the controller may be implemented by using a control chip that is disposed separately or by using a control chip of the electronic device, and the controller may be disposed at any position between the inner surface of the housing 20 of the electronic device and the support 30. This is not limited in this embodiment of this application.

Specifically, the force input region 201 of the housing 20 is an arbitrarily shaped region, and the force input region 201 may use any identification to indicate that a user can apply a pressure in this region.

The first electrode and the second electrode in this embodiment of this application only need to be respectively mounted on the inner surface of the force input region of the casing and the support, to implement pressure detection, space occupied in the electronic device is small, and the mounting is simple.

Figure 2:
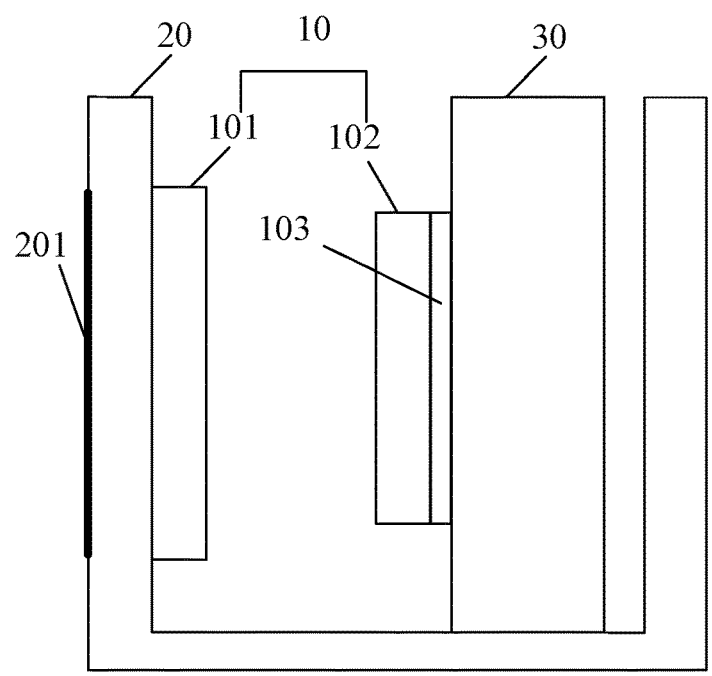
FIG. 2 is a structural diagram of another pressure detection module according to an embodiment of this application.

In a specific implementation of this embodiment of this application, with reference to FIG. 2, the pressure detection module 10 further includes a second reinforcing plate 103. The second electrode 102 is adhesively fixed to the support 30 through the second reinforcing plate 103.

In this embodiment of this application, the second reinforcing plate is disposed between the second electrode and the support, so that the second electrode is more closely attached to the support, and a supporting effect of the second reinforcing plate also enables the second electrode to have better flatness.

The second reinforcing plate 103 covers contact surfaces of the second electrode 102 and the second reinforcing plate 103, to enable the second reinforcing plate 103 to achieve a better attachment and supporting effect.

Specifically, the second reinforcing plate 103 may be adhesively fixed to the support 30 by using a double-sided tape, so that the second reinforcing plate 103 is mounted more easily at low costs.

To achieve a better adhesion effect, contact surfaces of the second reinforcing plate 103 and the support 30 each are adhered with a double-sided tape.

Specifically, the second reinforcing plate 103 may be a steel sheet.

Specifically, the second electrode 102 and the second reinforcing plate 103 may be adhesively fixed together by coating a conductive glue, to easily fix the second electrode 102 to the second reinforcing plate 103.

Figure 3:
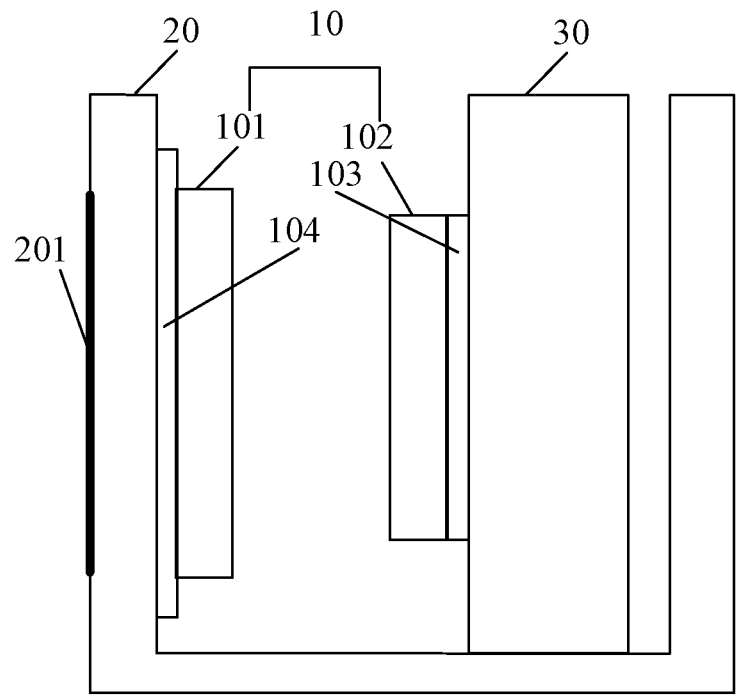
FIG. 3 is a structural diagram of still another pressure detection module according to an embodiment of this application.

In another specific implementation of this embodiment of this application, with reference to FIG. 3, the pressure detection module 10 further includes a first reinforcing plate 104. The first electrode 101 is adhesively fixed to the inner surface of the force input region 201 of the casing 20 through the first reinforcing plate 104.

In this embodiment of this application, the first reinforcing plate is disposed between the first electrode and the inner surface of the force input region of the housing, so that the first electrode is more tightly and firmly attached to the inner surface of the force input region of the housing, and a supporting effect of the first reinforcing plate also enable the first electrode to have better flatness.

The first reinforcing plate 104 covers contact surfaces of the first electrode 101 and the first reinforcing plate 104, to enable the first reinforcing plate 104 to achieve a better attachment and supporting effect.

Specifically, the first electrode 101 may be adhesively fixed to the first reinforcing plate 104 by using a double-sided tape, so that the first electrode 101 is mounted more easily.

To achieve a better adhesion effect, the contact surfaces of the first reinforcing plate 104 and the first electrode 101 each are adhered with a double-sided tape.

Specifically, the first reinforcing plate 104 may be a steel sheet.

Specifically, the first reinforcing plate 104 may be adhesively fixed to the inner surface of the force input region 201 of the housing 20 by applying a conductive glue, to easily fix the first reinforcing plate 104 to the inner surface of the force input region 201 of the housing 20.

Figure 4A:
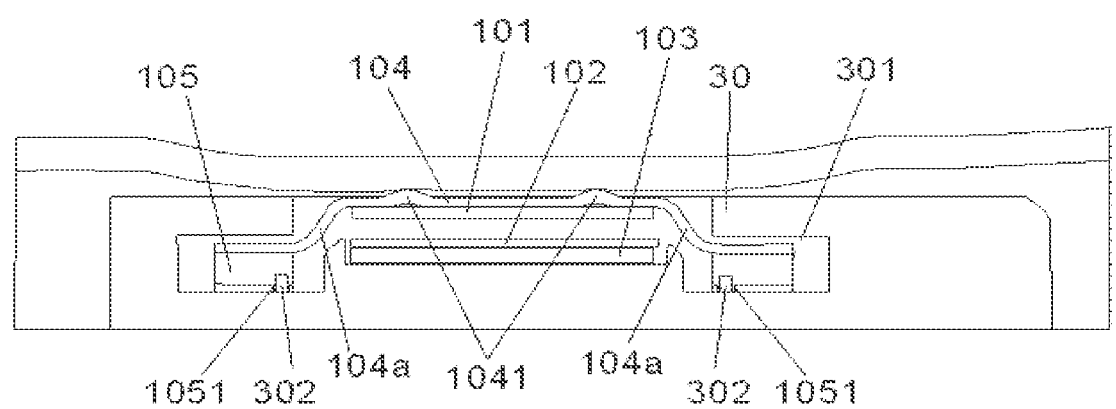
FIG. 4a to FIG. 4d are structural diagrams of still another pressure detection module according to an embodiment of this application.

In still another specific implementation of this embodiment of this application, with reference to FIG. 4a, a length of the first reinforcing plate 104 is longer than that of the second reinforcing plate 103, and an elastic limiting member 105 is provided at least one of two ends of the first reinforcing plate 104 in a length direction. A first end of the elastic limiting member 105 is limited on the support 30, a second end of the elastic limiting member 105 is fixed to the first reinforcing plate 104, and a gap is formed between the first end and the second end of the elastic limiting member 105.

Specifically, the length direction refers to a direction along a length of the support 30. It should be noted that since the first reinforcing plate is usually parallel to the support, the length direction may alternatively refer to the length direction of the first reinforcing plate.

Therefore, in this embodiment of this application, a resilience force required by the first electrode to move away from the second electrode is provided after the external pressure applied to the force input region of the housing is released by the elastic limiting member. Thus, the first electrode can be moved away from the second electrode to move back to a position when the first electrode is not stressed, to enable the pressure detection module to implement accurate pressure detection. The elastic limiting member is limited on the support through the first end of the elastic limiting member, the second end of the elastic limiting member is fixed on the first reinforcing plate, the gap between the first end and the second end of the elastic limiting member becomes smaller due to the external pressure obtained through conduction, and when the external pressure is released, a resilient force generated by restoration of the gap between the first end and the second end drives the first electrode fixed to the first reinforcing plate to move away from the second electrode. In this embodiment of this application, the first end and the second end of the elastic limiting member only need to be respectively fixed to the support and the first reinforcing plate, so that the elastic limiting member is easy to mount and occupies small internal space of the electronic device.

Figure 4B:
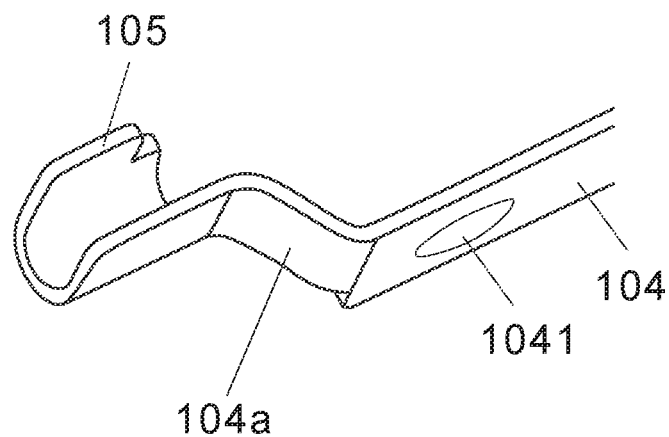

Specifically, to achieve a better resilient effect, with reference to FIG. 4b, the elastic limiting member 105 is U-shaped or C-shaped, and the first end and the second end of the elastic limiting member are respectively two side walls of the U-shaped or C-shaped elastic limiting member.

To provide a better resilient effect, at least one end of the first reinforcing plate 104 extends obliquely in a direction in which the second reinforcing plate 103 is located, to from an elastic arm 104a connected to the elastic limiting member 105.

Specifically, the support 30 further includes at least one accommodating chamber 301 for accommodating the elastic limiting member 105 and a clamping projection 302 for clamping the elastic limiting member 105 to prevent the elastic limiting member 105 from moving in the length direction.

Figure 4C:
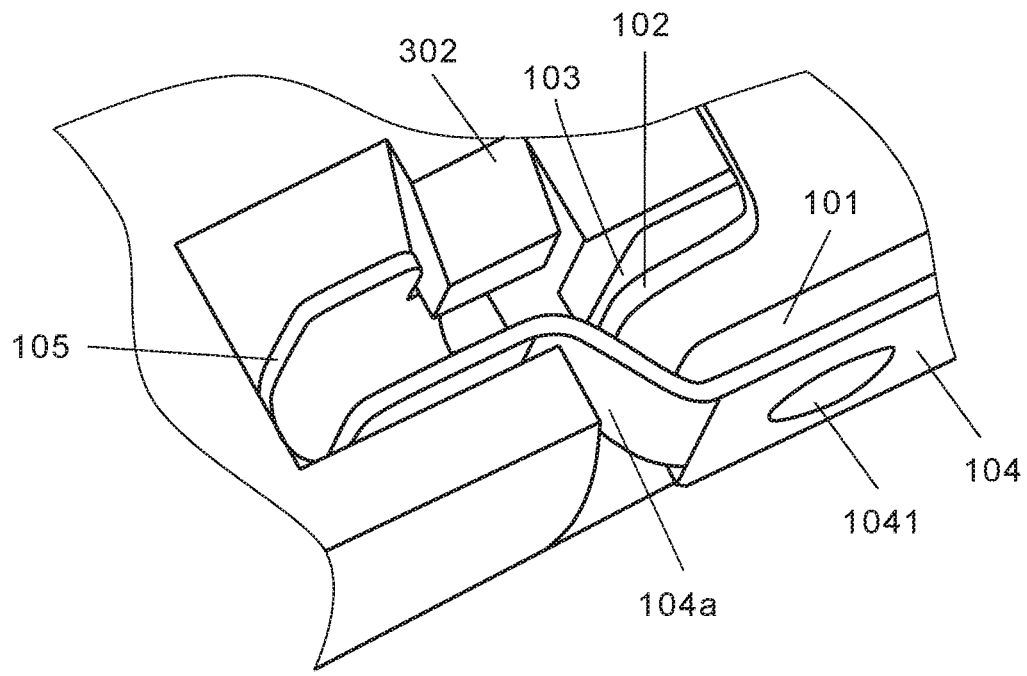

Refer to FIG. 4c. The first end of the elastic limiting member 105 is clamped and fixed to the clamping protrusion 302 on the support through a clamping groove 1051, and the clamping protrusion 302 is meshed with the clamping groove 1051, to prevent the elastic limiting member 105 from moving in the length direction.

Therefore, the elastic limiting member fixes the first end of the elastic limiting member to the support through the clamping groove and the clamping protrusion on the support, to prevent the first reinforcing plate fixed to the elastic limiting member to drive the first electrode to move in the length direction. This can ensure that the first reinforcing plate drives the first electrode to move only in a direction close to or away from the second electrode, and a better effect of pressure detection can be implemented.

Specifically, to facilitate production and mounting, the elastic limiting member 105 and the first reinforcing plate 104 are integrally formed.

Figure 4D:
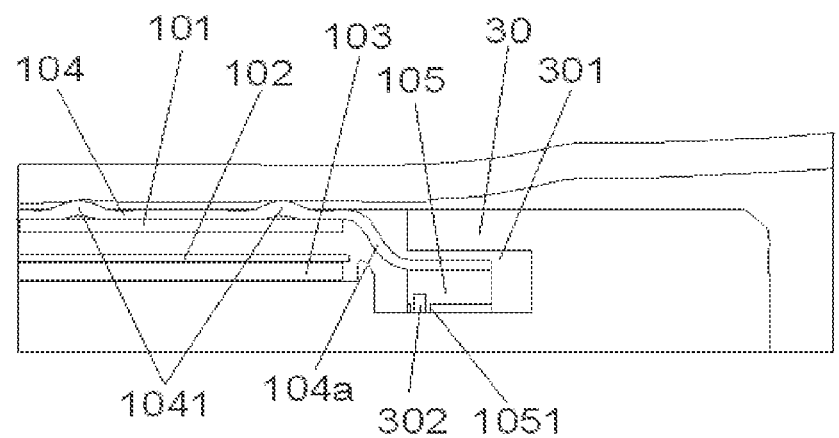

Specifically, with reference to FIG. 4a, the elastic limiting member 105 may be mounted at two ends that are of the first reinforcing plate 104 and that are parallel to the first electrode 101. With reference to FIG. 4d, the elastic limiting member 105 may alternatively be mounted at one end that is of the first reinforcing plate 104 and that is parallel to the first electrode 101, and a length of the pressure detection module can be further reduced if the elastic limiting member is only mounted at the end that is of the first reinforcing plate 104 and that is parallel to the first electrode 101, thereby reducing the space occupied in the electronic device.

To enable the first reinforcing plate to be in closer contact with the housing, a surface the first reinforcing plate 104 which is in contact with the housing 20 has at least one protruding point 1041, and the first reinforcing plate 104 is in close contact with the housing 20 through the protruding point 1041. Therefore, in this embodiment of this application, the external pressure received by the force input region 201 of the housing 20 can be more preferably conducted to the first reinforcing plate 104.

Figure 5:
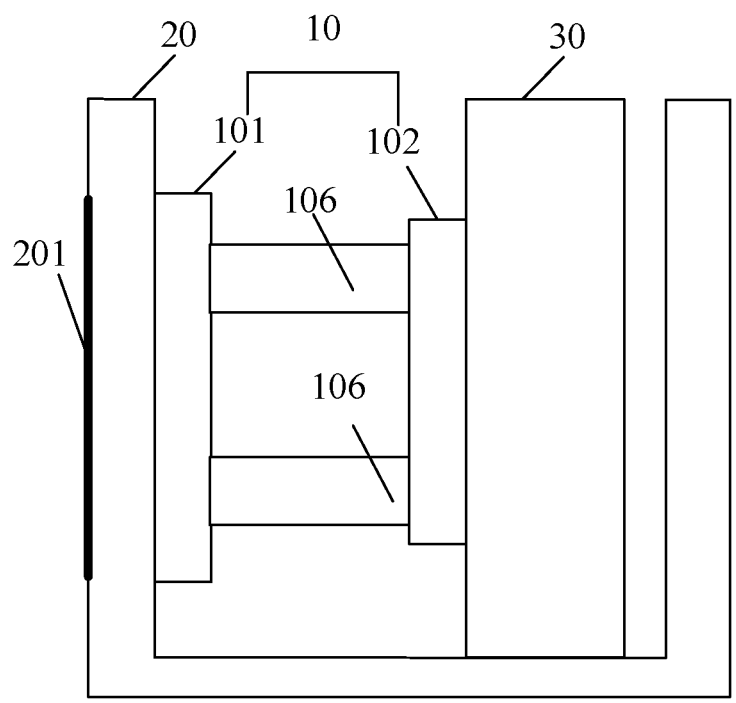
FIG. 5 is a structural diagram of still another pressure detection module according to an embodiment of this application.

In still another specific implementation of this embodiment of this application, with reference to FIG. 5, at least one elastic spacing member 106 is disposed between the first electrode 101 and the second electrode 102, one end of the elastic spacing member 106 is fixed to the first electrode 101, and the other end of the elastic spacing member 106 is fixed to the second electrode 102.

Therefore, when the external pressure applied to the force input region of the housing is released, a resilient force required by the first electrode to move away from the second electrode is provided by the elastic spacing member in this embodiment of this application. The elastic spacing member is compressed after receiving the external pressure conducted by the first electrode. After the external pressure is released, the resilient force generated by the elastic spacing member drives the first electrode to move away from the second electrode. The elastic spacing member in this embodiment of this application is easy to mount, and occupies a small space in the electronic device.

Specifically, to obtain a better resilient force, the elastic spacing member 106 is foam or a spring plate, and this enables the pressure detection module has a simple structure and low costs.

For example, in this embodiment of this application, two elastic spacing members 106 are used, and the two elastic spacing members 106 is configured to provide a more balanced resilient force.

In still another specific implementation of this embodiment of this application, a surface of the first electrode 101 which is disposed opposite to the second electrode 102 shields the second electrode 102. Therefore, an environment capacitance between an external environment and the second electrode is avoided, and accordingly, ambient interference is prevented from affecting accuracy of a detection result and product consistency of the pressure detection module.

In still another specific implementation of this embodiment of this application, the second electrode 102 is adhesively fixed to the support 30 to implement easier mounting.

In this embodiment of this application, the second reinforcing plate is not needed, and it may only need to adhesively fix the second electrode to the support.

Specifically, the second electrode 102 may be adhesively fixed to the support 30 by using a double-sided tape, so that the second electrode 102 is mounted more easily.

To achieve a better adhesion effect, contact surfaces of the second electrode 102 and the support 30 each are adhered with a double-sided tape.

Figure 6:
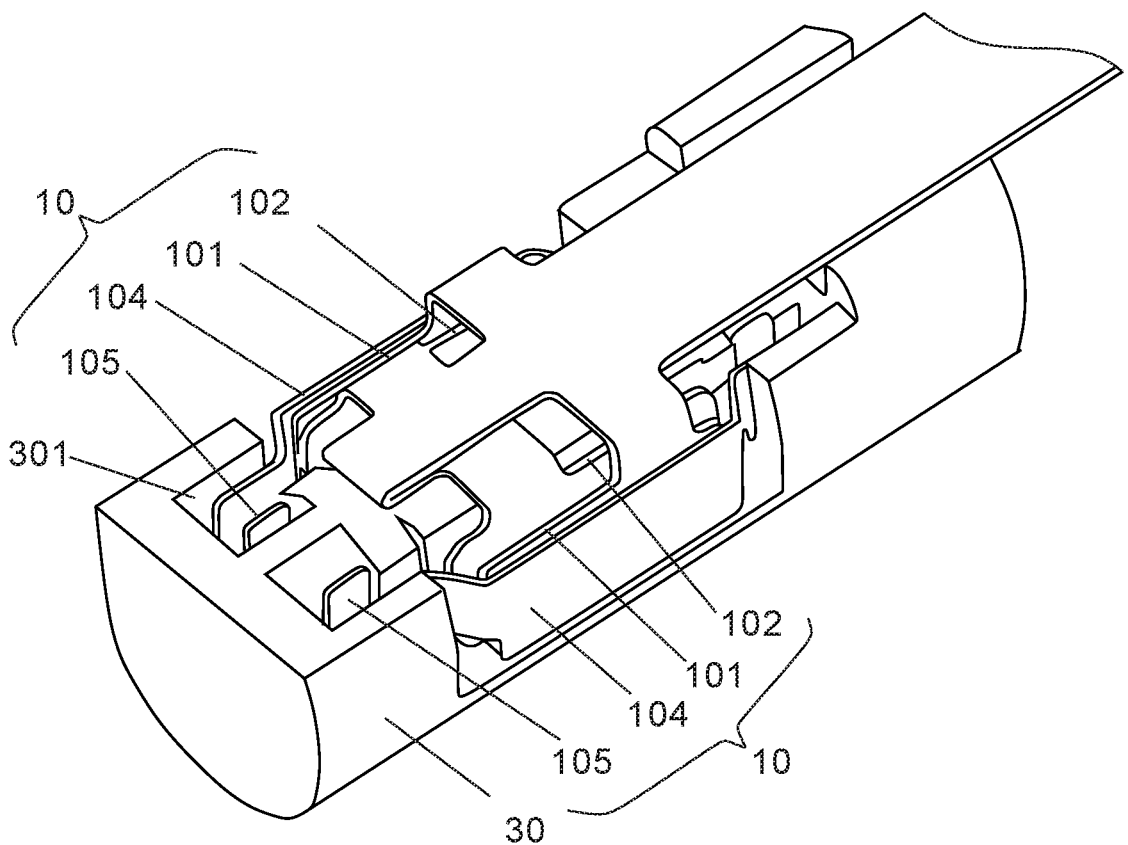
FIG. 6 is a partial structure diagram of an electronic device according to an embodiment of this application.

An embodiment of this application provides an electronic device. As shown in FIG. 6, FIG. 6 is a partial structure diagram of the electronic device according to this embodiment of this application. The pressure detection module 10 in any specific implementation of the embodiment described above is disposed in a housing of the electronic device.

Figure 7:
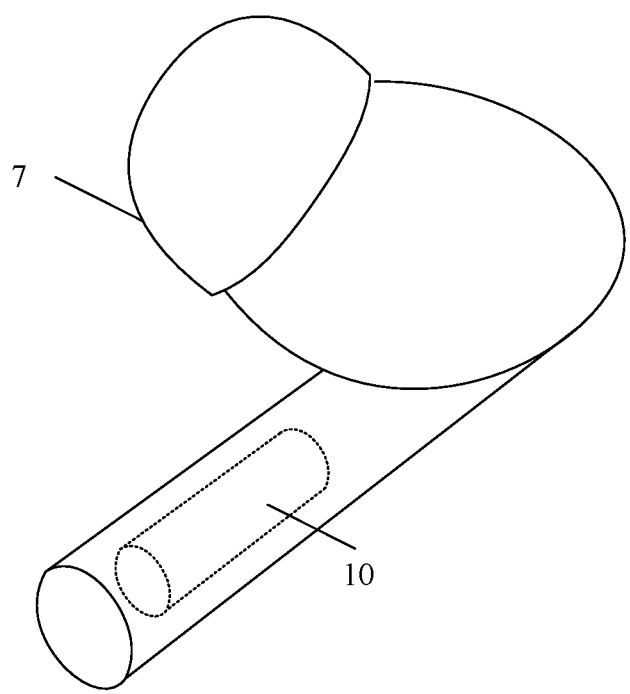
FIG. 7 is a schematic structural diagram of an earphone according to an embodiment of this application.

Specifically, with reference to FIG. 7, the electronic device is an earphone 7, and the pressure detection module 10 is disposed inside a housing of a stem of an earphone.

If one pressure detection module is disposed inside the housing of the electronic device, the space occupied in the housing by the pressure detection modules can be saved, fewer steps are needed for assembling the pressure detection modules, and a process is simpler.

Figure 8A:
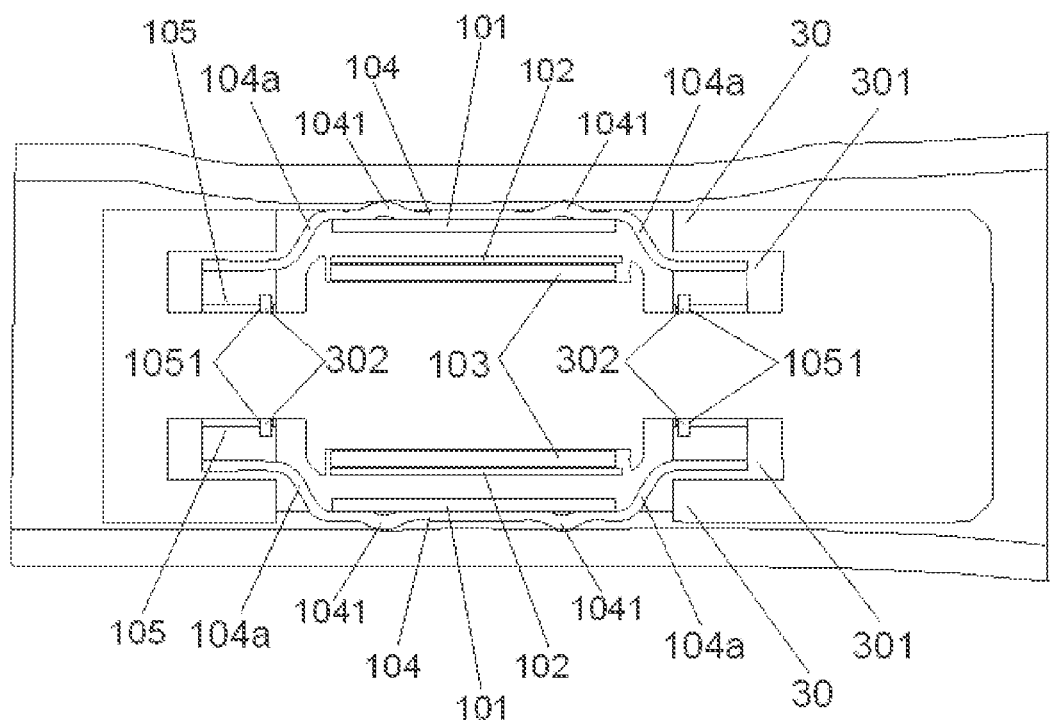
FIG. 8a and FIG. 8b are partial structure diagrams of another electronic device according to an embodiment of this application.
Figure 8B:
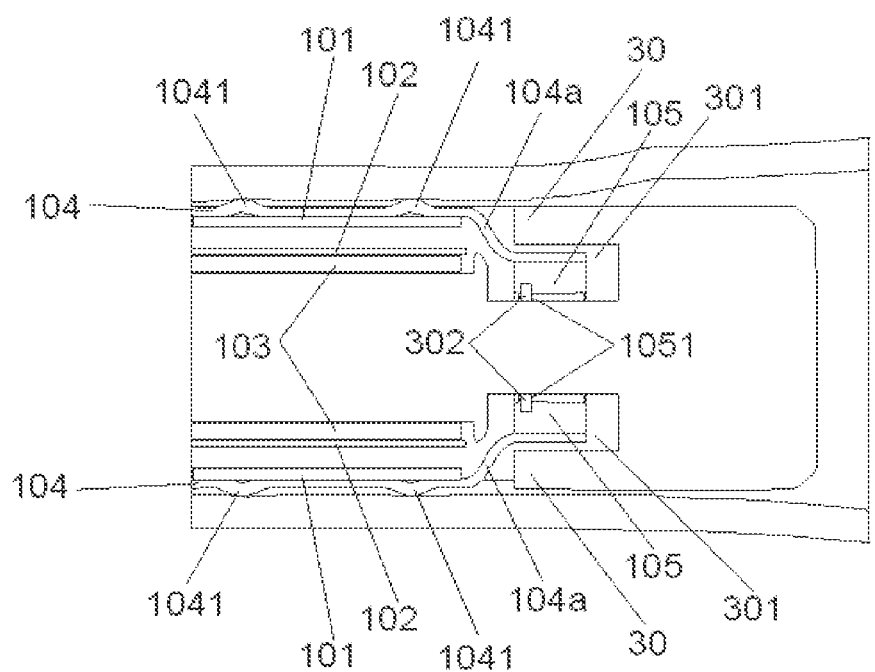

With reference to FIG. 8a and FIG. 8b, the pressure detection modules 10 is two in number, and the two pressure detection modules 10 are symmetrically disposed on both sides of the support 30. With reference to FIG. 8a, the elastic limiting member 105 may be mounted at two ends that are of the first reinforcing plate 104 and that are parallel to the first electrode 101. With reference to FIG. 8b, the elastic limiting member 105 may alternatively be mounted at one end that is of the first reinforcing plate 104 and that is parallel to the first electrode 101, and the length of the pressure detection module can be further reduced if the elastic limiting member is only mounted at the end that is of the first reinforcing plate 104 and that is parallel to the first electrode 101, thereby reducing the space occupied in the electronic device.

If two pressure detection modules are disposed inside the housing of the electronic device, a more accurate pressure sensing result can be provided, and a user may choose to apply an external force in different force input regions of the housing, so that the user can use the electronic device more conveniently.

Specifically, to facilitate manufacturing and mounting, the two pressure detection modules each are integrated with the support. The whole formed by the two pressure detection modules and the support is directly inserted into the housing of the electronic device, and is more suitable for mounting with the cylindrical housing, and the pressure detection modules can be mounted without cutting the housing. This may simplify a manufacturing process and costs of the electronic device, and may also improve a product yield of the pressure detection modules.

It should also be noted that the term "include", "contain", or any other variation thereof is intended to cover non-exclusive inclusion, so that a process, method, commodity, or device that includes a series of elements not only includes those elements, but also includes other elements not explicitly listed, or also includes elements inherent to such process, method, commodity, or device. Without further restrictions, an element defined by a statement "including one" does not exclude existence of other identical elements in the process, method, commodity, or device that includes the element.

All the embodiments in this specification are described in a progressive way, the same and similar parts of the embodiments can be referred to each other, and each embodiment focuses on differences from the other embodiments. Especially, for a system embodiment, as it is basically similar to a method embodiment, the system embodiment is described relatively simply. For related parts, refer to the description in the method embodiment.

The above are only embodiments of this application, and are not construed as a limitation on this application. For those skilled in the art, this application may have various modifications and variations. Any modification, equivalent substitution, improvement, and the like made within the spirit and principle of this application should fall within the scope of the claims of this application.

What is claimed is:

1. A pressure detection module, wherein the pressure detection module is disposed between a support and an inner surface of a housing of an electronic device, and the pressure detection module comprises a first electrode, a second electrode, and a controller;
    the first electrode is fixed to an inner surface of a force input region of the housing, the second electrode is fixed to the support, and the second electrode is disposed opposite to the first electrode;
    the force input region of the housing is configured to drive the first electrode to move towards the second electrode based on a received external pressure; and
    the controller is configured to determine a pressure detection result of the external pressure based on a capacitance change between the first electrode and the second electrode;
    wherein the pressure detection module further comprises a first reinforcing plate and a second reinforcing plate, the first electrode is adhesively fixed to the inner surface of the force input region of the housing through the first reinforcing plate, the second electrode is adhesively fixed to the support through the second reinforcing plate, and a length of the first reinforcing plate is greater than that of the second reinforcing plate.

2. The pressure detection module according to claim 1, wherein an elastic limiting member is provided at least one of two ends of the first reinforcing plate in a length direction, wherein a first end of the elastic limiting member is limited on the support, a second end of the elastic limiting member is fixed to the first reinforcing plate, and a gap is formed between the first end and the second end of the elastic limiting member.

3. The pressure detection module according to claim 2, wherein the elastic limiting member is U-shaped or C-shaped, and the first end and the second end of the elastic limiting member are respectively two side walls of the U-shaped or C-shaped elastic limiting member.

4. The pressure detection module according to claim 3, wherein the elastic limiting member is integrally formed with the first reinforcing plate.

5. The pressure detection module according to claim 4, wherein at least one end of the first reinforcing plate extends obliquely in a direction in which the second reinforcing plate is located, to form an elastic arm connected to the elastic limiting member.

6. The pressure detection module according to claim 5, wherein the first end of the elastic limiting member is clamped and fixed to a clamping protrusion on the support through a clamping groove, and the clamping protrusion is meshed with the clamping groove, to prevent the elastic limiting member from moving in the length direction.

7. The pressure detection module according to claim 1, wherein a surface of the first reinforcing plate which is in contact with the housing has at least one protruding point, and the first reinforcing plate is in close contact with the housing through the protruding point.

8. The pressure detection module according to claim 1, wherein at least one elastic spacing member is disposed between the first electrode and the second electrode, one end of the elastic spacing member is fixed to the first electrode, and the other end of the elastic spacing member is fixed to the second electrode.

9. The pressure detection module according to claim 8, wherein the elastic spacing member is foam or a spring plate.

10. The pressure detection module according to claim 1, wherein a surface of the first electrode which is disposed opposite to the second electrode shields the second electrode.

11. An electronic device, having at least one pressure detection module disposed inside a housing of the electronic device, wherein the pressure detection module is disposed between a support and an inner surface of the housing, and the pressure detection module comprises a first electrode, a second electrode, and a controller;
    the first electrode is fixed to an inner surface of a force input region of the housing, the second electrode is fixed to the support, and the second electrode is disposed opposite to the first electrode;
    the force input region of the housing is configured to drive the first electrode to move towards the second electrode based on a received external pressure; and
    the controller is configured to determine a pressure detection result of the external pressure based on a capacitance change between the first electrode and the second electrode;
    wherein the pressure detection module further comprises a first reinforcing plate and a second reinforcing plate, the first electrode is adhesively fixed to the inner surface of the force input region of the housing through the first reinforcing plate, the second electrode is adhesively fixed to the support through the second reinforcing plate, and a length of the first reinforcing plate is greater than that of the second reinforcing plate.

12. The electronic device according to claim 11, wherein the pressure detection module is two in number, and the two pressure detection modules are symmetrically disposed on both sides of the support.

13. The electronic device according to claim 12, wherein the two pressure detection modules each are integrated with the support.

14. The electronic device according to claim 11, wherein an elastic limiting member is provided at least one of two ends of the first reinforcing plate in a length direction, wherein a first end of the elastic limiting member is limited on the support, a second end of the elastic limiting member is fixed to the first reinforcing plate, and a gap is formed between the first end and the second end of the elastic limiting member; the support further comprises at least one accommodating chamber for accommodating the elastic limiting member and a clamping projection for clamping the elastic limiting member to prevent the elastic limiting member from moving in the length direction.

15. The electronic device according to claim 11, wherein the electronic device is an earphone, and the pressure detection module is disposed inside a housing of a stem of the earphone.

\* \* \* \* \*